(12) United States Patent
Manesh et al.

(10) Patent No.: US 8,104,524 B2
(45) Date of Patent: Jan. 31, 2012

(54) TENSION-BASED NON-PNEUMATIC TIRE

(75) Inventors: Ali Manesh, Chicago, IL (US); Michael Tercha, Weston, WI (US); Olukemi Ayodeji, Wausau, WI (US); Brian Anderson, Wausau, WI (US); Brian J. Meliska, Weston, WI (US); Fedelis Ceranski, Marathon, WI (US)

(73) Assignee: Resilient Technologies LLC, Wausau, WI (US)

( * ) Notice: Subject to any disclaimer, the term of this patent is extended or adjusted under 35 U.S.C. 154(b) by 1046 days.

(21) Appl. No.: 11/691,968

(22) Filed: Mar. 27, 2007

(65) Prior Publication Data

US 2009/0283185 A1 Nov. 19, 2009

(51) Int. Cl.
*B60C 7/00* (2006.01)
(52) U.S. Cl. ............... 152/326; 152/301; 152/7
(58) Field of Classification Search ............. 152/5, 7, 152/11, 246, 300–301, 323–329; 267/279, 267/281–282, 292, 141, 141.6, 141.7, 144, 267/147, 181; 248/615, 632–634, 638
See application file for complete search history.

(56) References Cited

U.S. PATENT DOCUMENTS

| 576,072 | A | 1/1897 | Humbrecht |
|---|---|---|---|
| 637,200 | A | 11/1899 | Finin |
| 654,897 | A | 7/1900 | Keller |
| 748,797 | A | 1/1904 | Schwieger |
| 818,568 | A | 4/1906 | Sims |
| 820,077 | A | 5/1906 | Whiteley |
| 856,957 | A | 6/1907 | Hubbard |
| 927,154 | A | 7/1909 | Martin |
| 987,340 | A | 3/1911 | Besler |

(Continued)

FOREIGN PATENT DOCUMENTS

CN 86106585 7/1987

(Continued)

OTHER PUBLICATIONS

International Search Report for Application No. PCT/US2009/058652, dated Nov. 17, 2009, in 2 pages.

(Continued)

*Primary Examiner* — Jason Bellinger
(74) *Attorney, Agent, or Firm* — Knobbe, Martens, Olson & Bear, LLP

(57) ABSTRACT

A non-pneumatic tire for supporting a load by working in tension comprising a generally annular inner surface, a generally annular outer ring, and an interconnected web having a plurality of web elements and comprising a plurality of generally polygonal openings. Web elements are sized, oriented and comprised of a material that facilitates buckling when subjected to a compressive load. By buckling, those elements in a deformed portion of the tire between a hub and a footprint region where the tire contacts a surface may assume a significantly reduced portion of the load, if any. This causes web elements in other portions of the interconnected web to operate in tension to support the load. Since the tire is non-pneumatic, it may be easier to maintain and may have a longer life than standard pneumatic tires since it eliminates the possibility of blowouts, flat tires, or tires operating with low air pressure. By virtue of the portion of the tire in the footprint region not bearing a significant portion of the load, non-pneumatic tire may also exhibit a more comfortable ride subject to less noise and vibration and improved handling capabilities.

26 Claims, 10 Drawing Sheets

U.S. PATENT DOCUMENTS

| | | | |
|---|---|---|---|
| 1,041,829 | A | 10/1912 | Mallory |
| 1,042,035 | A | 10/1912 | Ray |
| 1,057,734 | A | 4/1913 | Harrison |
| 1,060,480 | A | 4/1913 | Minnick |
| 1,066,267 | A | 7/1913 | Gerleit |
| 1,085,700 | A | 2/1914 | Percy |
| 1,106,238 | A | 8/1914 | Papadopoulos |
| 1,136,546 | A | 4/1915 | Markson |
| 1,146,654 | A | 7/1915 | Rietschel |
| 1,154,504 | A | 9/1915 | Gano |
| 1,156,311 | A | 10/1915 | Rabey |
| 1,190,874 | A | 7/1916 | Durfee |
| 1,232,127 | A | 7/1917 | Uhrinecz |
| 1,242,269 | A | 10/1917 | Teeple |
| 1,244,276 | A | 10/1917 | Anglemyer |
| 1,252,736 | A | 1/1918 | Szakacs |
| 1,262,501 | A | 4/1918 | Huetter |
| 1,262,550 | A | 4/1918 | Northern |
| 1,282,690 | A | 10/1918 | Hamlin |
| 1,286,634 | A | 12/1918 | Holland |
| 1,287,255 | A | 12/1918 | De Carmona |
| 1,292,729 | A | 1/1919 | Drach |
| 1,300,933 | A | 4/1919 | Divers |
| 1,365,181 | A | 1/1921 | Marzak et al. |
| 1,451,517 | A | 4/1923 | Smith |
| 1,461,928 | A | 7/1923 | Miller |
| 1,557,437 | A | 10/1925 | Dodge |
| 1,640,613 | A | 8/1927 | Miller |
| 1,660,845 | A | 2/1928 | Mamessier |
| 1,710,524 | A | 4/1929 | Vitenko |
| 1,753,735 | A | 4/1930 | Athey |
| 1,948,412 | A | 2/1934 | Bennett |
| 2,055,461 | A | 9/1936 | Baddock |
| 2,235,378 | A | 3/1941 | Martin |
| 2,283,274 | A | 5/1942 | Martin |
| 2,298,142 | A | 10/1942 | Martin |
| 2,331,212 | A | 10/1943 | Martin |
| 2,341,721 | A | 2/1944 | Kapp |
| 2,620,844 | A | 12/1952 | Lord |
| 2,701,431 | A | 2/1955 | Whitesell |
| 2,742,941 | A | 4/1956 | Johnson |
| 2,912,032 | A | 11/1959 | Alexander |
| 3,182,705 | A | 5/1965 | Markow |
| 3,188,775 | A | 6/1965 | Cosmos |
| 3,219,090 | A | 11/1965 | Cislo |
| 3,237,667 | A | 3/1966 | Lindley |
| 3,311,149 | A | 3/1967 | Mathiesen |
| 3,380,779 | A | 4/1968 | Albright |
| 3,465,804 | A | 9/1969 | Dupre |
| 3,493,027 | A | 2/1970 | Dewhirst et al. |
| 3,635,273 | A | 1/1972 | Patecell |
| 4,111,249 | A | 9/1978 | Markow |
| 4,153,095 | A | 5/1979 | Sarkissian |
| 4,226,273 | A | 10/1980 | Long et al. |
| 4,235,270 | A * | 11/1980 | Kahaner et al. .................. 152/7 |
| 4,287,927 | A | 9/1981 | Caravito et al. |
| 4,350,196 | A | 9/1982 | Hampshire |
| 4,459,167 | A | 7/1984 | Markow et al. |
| 4,549,592 | A | 10/1985 | Schroder |
| 4,553,577 | A | 11/1985 | Gregg |
| 4,558,727 | A | 12/1985 | Golata et al. |
| 4,673,014 | A | 6/1987 | Markow |
| 4,832,098 | A | 5/1989 | Palinkas et al. |
| 4,894,281 | A | 1/1990 | Yagi et al. |
| 4,917,162 | A | 4/1990 | De Longcamp |
| 4,921,029 | A | 5/1990 | Palinkas et al. |
| 4,934,425 | A | 6/1990 | Gajewski et al. |
| 4,945,962 | A * | 8/1990 | Pajtas .................. 152/7 |
| 5,023,040 | A | 6/1991 | Gajewski et al. |
| 5,042,544 | A | 8/1991 | Dehasse |
| 5,050,656 | A | 9/1991 | Ho |
| 5,086,815 | A | 2/1992 | Panaroni et al. |
| 5,139,066 | A | 8/1992 | Jarman |
| 5,168,910 | A | 12/1992 | Zhang et al. |
| 5,174,634 | A | 12/1992 | Blanck et al. |
| 5,223,599 | A | 6/1993 | Gajewski |
| 5,236,027 | A | 8/1993 | Lu |
| 5,265,659 | A | 11/1993 | Pajtas et al. |
| 5,343,916 | A | 9/1994 | Duddey et al. |
| 5,353,853 | A | 10/1994 | Hanson |
| 5,460,213 | A | 10/1995 | Pajtas |
| 5,494,090 | A | 2/1996 | Kejha |
| 5,535,800 | A | 7/1996 | Abbott |
| 5,743,316 | A | 4/1998 | Chrobak |
| 6,170,544 | B1 | 1/2001 | Hottebart |
| 6,279,630 | B1 | 8/2001 | Ims |
| 6,298,891 | B1 | 10/2001 | Harris |
| 6,364,424 | B1 | 4/2002 | Lashlee et al. |
| 6,374,887 | B1 | 4/2002 | Subotics |
| 6,394,407 | B1 * | 5/2002 | Ryaboy .................. 248/638 |
| 6,431,235 | B1 | 8/2002 | Steinke |
| 6,450,222 | B1 | 9/2002 | Fleming |
| 6,467,519 | B1 | 10/2002 | Owen |
| 6,564,842 | B2 | 5/2003 | Abinal et al. |
| 6,568,443 | B2 | 5/2003 | Shoner |
| 6,615,885 | B1 | 9/2003 | Ohm |
| 6,640,859 | B1 | 11/2003 | Laurent et al. |
| 6,648,039 | B1 | 11/2003 | Bina |
| 6,679,012 | B1 * | 1/2004 | Chen et al. .................. 248/638 |
| 6,681,822 | B2 | 1/2004 | Adams et al. |
| 6,698,480 | B1 | 3/2004 | Cornellier |
| 6,769,465 | B2 | 8/2004 | Rhyne et al. |
| 6,789,810 | B2 | 9/2004 | Strong |
| 6,983,776 | B2 | 1/2006 | Thompson et al. |
| 6,994,134 | B2 | 2/2006 | Grah |
| 6,994,135 | B2 | 2/2006 | Delfino et al. |
| 7,013,939 | B2 | 3/2006 | Rhyne et al. |
| 7,032,634 | B2 | 4/2006 | Laurent et al. |
| 7,143,797 | B2 | 12/2006 | Vannan |
| 7,174,936 | B2 | 2/2007 | Becker et al. |
| 7,201,194 | B2 | 4/2007 | Rhyne et al. |
| 7,418,988 | B2 | 9/2008 | Cron et al. |
| 7,650,919 | B2 | 1/2010 | Rhyne et al. |
| 2002/0096237 | A1 | 7/2002 | Burhoe et al. |
| 2005/0076983 | A1 | 4/2005 | Kimura et al. |
| 2006/0113016 | A1 | 6/2006 | Cron |
| 2006/0174989 | A1 | 8/2006 | Jones |
| 2007/0215259 | A1 | 9/2007 | Burns |
| 2007/0267116 | A1 | 11/2007 | Rhyne et al. |
| 2008/0053586 | A1 | 3/2008 | Hanada et al. |
| 2008/0073014 | A1 | 3/2008 | Abe |
| 2008/0149247 | A1 | 6/2008 | Heuze et al. |
| 2008/0314486 | A1 | 12/2008 | Manesh et al. |
| 2009/0107596 | A1 | 4/2009 | Palinkas et al. |
| 2009/0173421 | A1 | 7/2009 | Love et al. |
| 2009/0211674 | A1 | 8/2009 | Hanada et al. |
| 2009/0211678 | A1 | 8/2009 | Palinkas et al. |
| 2009/0211681 | A1 | 8/2009 | Palinkas et al. |
| 2009/0250149 | A1 | 10/2009 | Sebe |
| 2009/0301625 | A1 | 12/2009 | Moon et al. |
| 2011/0079335 | A1 | 4/2011 | Manesh et al. |

FOREIGN PATENT DOCUMENTS

| | | | |
|---|---|---|---|
| CN | 1154582 | | 6/2004 |
| DE | 102006037666 | | 2/2008 |
| EP | 0159888 | | 10/1985 |
| EP | 0401564 | B1 | 3/1994 |
| EP | 1123817 | A2 | 8/2001 |
| EP | 1902866 | A1 | 3/2008 |
| EP | 1980420 | | 10/2008 |
| FR | 2893274 | A1 | 5/2007 |
| JP | 1-311902 | * | 12/1989 .................. 152/5 |
| JP | 406109050 | A * | 4/1994 .................. 267/181 |
| JP | 2009-269413 | | 11/2009 |
| WO | WO 03/018332 | | 3/2003 |
| WO | WO 2006/116807 | | 11/2006 |
| WO | WO 2007/057975 | | 5/2007 |
| WO | WO 2008/050503 | | 5/2008 |
| WO | WO 2009/135561 | A2 | 11/2009 |

OTHER PUBLICATIONS

Written Opinion of the International Searching Authority for Application No. PCT/US2009/058652, dated Nov. 17, 2009, in 6 pages.

International Search Report for Application No. PCT/US08/58308, dated Aug. 7, 2008, in 2 pages.

Written Opinion of the International Searching Authority for Application No. PCT/US08/58308, dated Aug. 7, 2008, in 7 pages.
Chinese Office Action for Chinese Application No. 200880010003.6, dated Dec. 29, 2010, in 13 pages.
International Search Report for International Application No. PCT/US2010/042613, dated Mar. 2, 2011, in 4 pages.
Written Opinion for International Application No. PCT/US2010/042613, dated Mar. 2, 2011, in 5 pages.
Chinese Notification of Decision of Rejection for Application No. 200880010003.6, dated Jun. 17, 2011, 15 pages.

* cited by examiner

TENSION-BASED NON-PNEUMATIC TIRE

This invention was made, in part, with United States government support awarded by the United States Army Research Laboratory under grant number W911NF-06-2-0021. Accordingly, the United States may have certain rights in this invention.

BACKGROUND OF THE INVENTION

1. Field of the Invention

The present invention is directed to a non-pneumatic tire (NPT) or combination of a tire and hub that supports an applied load by working in tension and is capable of serving as a replacement for pneumatic tires and an improvement over other forms of non-pneumatic tires.

2. Description of the Related Art

Non-pneumatic, or airless, tires have historically been comprised largely of an entirely solid substance. These solid tires made the ride rather uncomfortable for passengers and caused greater damage to the suspension of a vehicle, which had to compensate for their lack of "give." Eventually, it was found that putting pressurized air in tires created a more comfortable ride. However, along with their advantages, pneumatic tires still possess some drawbacks.

The material that encloses standard pneumatic tires is susceptible to leaking the pressurized air it tries to withhold. This occurs both via leakage around the wheel rim, and on a smaller scale, when the rubber of the tire absorbs the oxygen. As a result, loss of pressure causes the tire to flatten in the area where the load is applied, subjecting a larger portion of the tire to the load with every revolution, leading to quicker degradation of the tire. Furthermore, a tire reliant upon pressurized air is susceptible to being punctured leading to rapid release of the pressurized air.

Focusing on fuel efficiency, safety and ride comfort, several attempts have been made to address the problems associated with pneumatic tires while retaining their advantages over solid non-pneumatic tires. By way of example, U.S. Published Application 2006/0113016 by Cron, et al, and assigned to Michelin, discloses a non-pneumatic tire that it commercially refers to as the Tweel™. In the Tweel™, the tire combines with the wheel. It is made up of four parts that are eventually bonded together: the hub, a spoke section, a reinforced annular band that surrounds the spoke section, and a rubber tread portion that contacts the ground.

Other alternatives to standard non-pneumatic tires have been attempted, including making solid tires out of polyurethane instead of rubber and suspending reinforcement materials within the polyurethane during molding. Another alternative is to use internal ribs made of a thermoplastic that are subsequently reinforced with glass fibers. A third alternative is to use an electroactive polymer that is capable of changing shape when an electrical current is applied. This allows the tire to change shape or size based upon road conditions by using the automobile's electrical system.

BRIEF SUMMARY OF THE INVENTION

A novel non-pneumatic tire for supporting an applied load is provided, the tire having an inner surface that attaches to a hub or wheel having an axis of rotation, an outer ring, and an interconnected web between the inner surface and the outer ring. The interconnected web is made of a material that is relatively stronger in tension than in compression such that the portion of the web between the hub and a footprint region may either buckle or be subject to a significantly smaller portion of the load, if any, while the rest of the load may be distributed through the remaining portion of the interconnected web. In one embodiment, the interconnected web may attach directly to the hub or tread-carrying layer.

The interconnected web may be one of multiple possible forms. In one embodiment, the elements of the web form multiple layers of interfitting generally polygonal openings such that there are at least two adjacent layers of openings spaced at different radial distances from each other when viewed at any radial slice of the web. The openings of one layer may be similarly shaped compared to the openings of at least one other layer, but they may also be shaped differently. In addition, the openings of one layer may or may not be similarly shaped to the other openings in that same layer. Furthermore, while the openings of one layer may be similarly shaped to the openings of another layer, they may be sized differently, such that the openings of a radially outer layer may be larger or smaller than the openings of a comparatively radially inner layer.

A major advantage of using a non-pneumatic tire compared to a standard tire is eliminating flat tires. If a portion of the web is compromised, the load will be redistributed through other elements of the web by virtue of the fact that the web is interconnected, prolonging the life of the tire. In addition, by not carrying any significant load along a footprint region where the tire contacts a surface, a smoother ride results since the non-pneumatic tire is less susceptible to shock and vibration.

These and other features and advantages are evident from the following description of the present invention, with reference to the accompanying drawings.

DETAILED DESCRIPTION OF THE INVENTION

Benefits Over Traditional Pneumatic Tires

A non-pneumatic tire 10 may exhibit many of the same performance characteristics as traditional pneumatic tires. It demonstrates a general ride quality and traction similar to current pneumatic tires. It may also have costs, weight, load supporting capability and tread life similar to current pneumatic tires.

Figure 2:
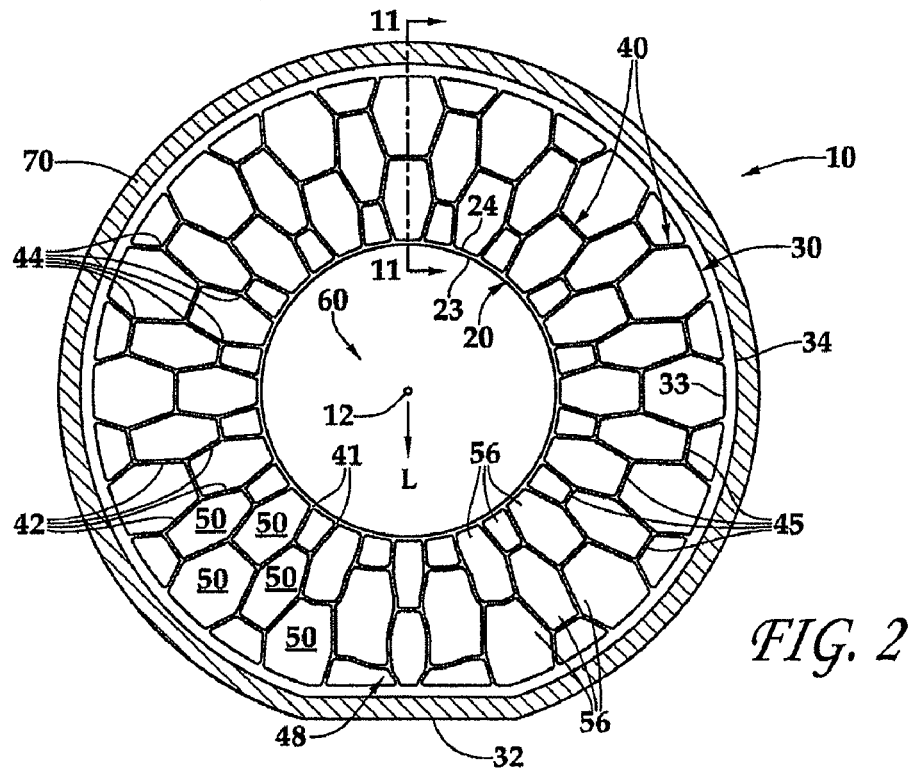
FIG. 2 is a front view of the non-pneumatic tire of FIG. 1 being deformed when subjected to a load.
Figure 3:
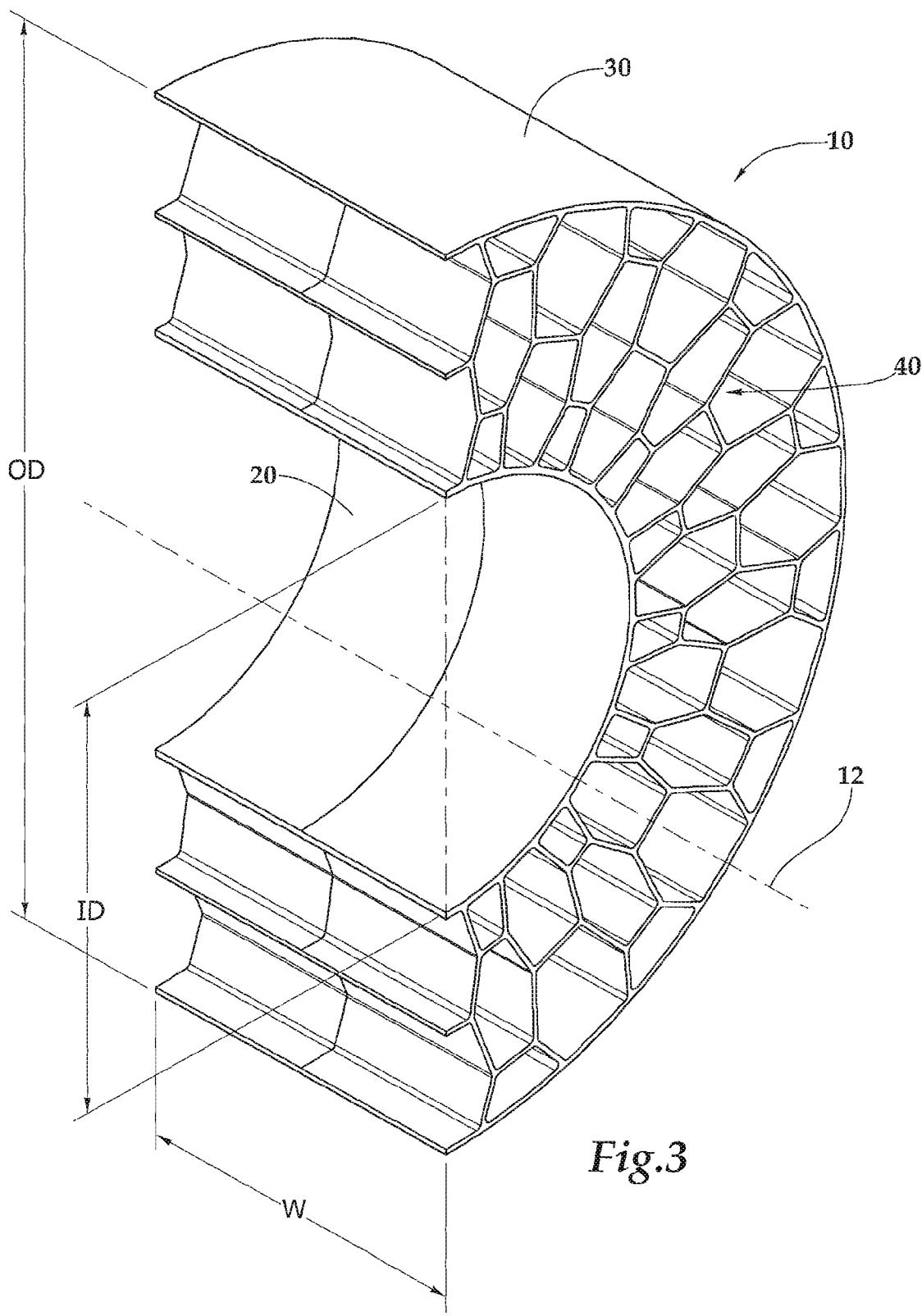
FIG. 3 is a sectional perspective view of the undeformed non-pneumatic tire taken along line 3-3 in FIG. 1.
Figure 4:
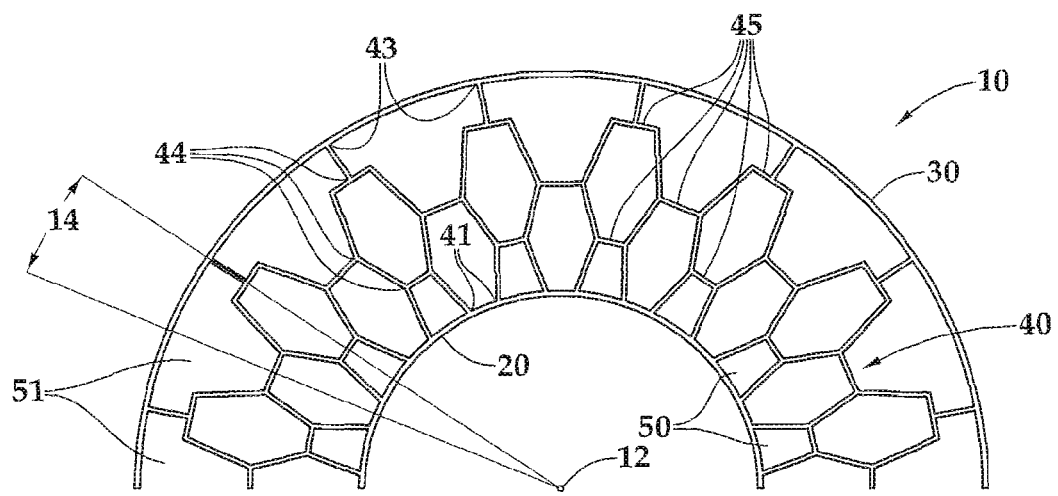
FIG. 4 is a front view of another embodiment of an undeformed non-pneumatic tire.
Figure 5:
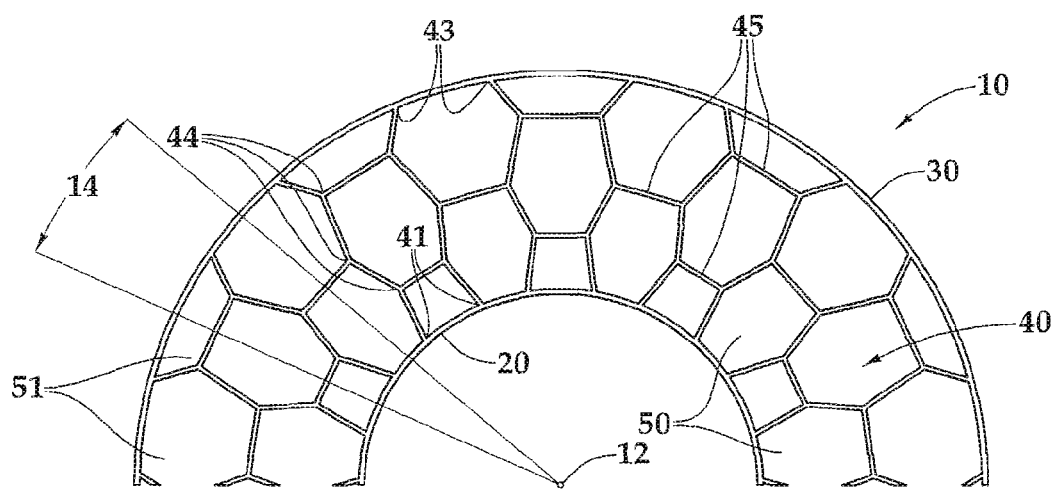
FIG. 5 is a front view of still another embodiment of an undeformed non-pneumatic tire.
Figure 6:
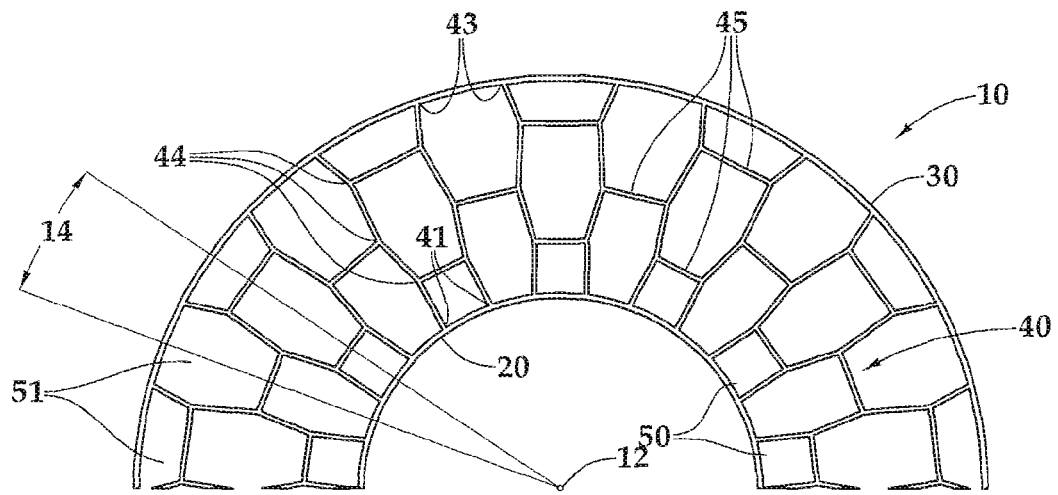
FIG. 6 is a front view of a further embodiment of an undeformed non-pneumatic tire.

However, the non-pneumatic tire of the present invention demonstrates several advantages over standard pneumatic tires. In addition to virtually eliminating blowouts and flat tires, the ability of a generally annular outer ring 30 and an interconnected web 40 to deform in an area around footprint region 32 as shown in FIG. 2 reduces the stresses placed on hub 60 when hitting a bump, pothole, or similar obstacle, thereby making non-pneumatic tire 10 and hub 60 less susceptible to damage. Without relying on air pressure to maintain its functionality, interconnected web 40 of non-pneumatic tire 10 may also be better able to withstand damage caused by projectiles. If a portion of interconnected web 40 is damaged, a load, L, which is generally applied perpendicular to axis of rotation 12, may be transferred to the remaining elements so that a vehicle relying on non-pneumatic tires 10 is not immediately disabled. In addition, because non-pneumatic tire 10 cannot be over- or under-inflated, footprint region 32 may remain generally constant, improving fuel efficiency as compared to traditional pneumatic tires.

Generally annular outer ring 30 combined with interconnected web 40 may display higher lateral stiffness compared to standard pneumatic tires, especially in the embodiment in which tread-carrying layer 70 is attached. Therefore, while general ride quality may be similar to standard pneumatic tires, non-pneumatic tire 10 may achieve improved cornering ability. Non-pneumatic tire 10 may also require less maintenance by obviating the need to check and maintain air pressure.

Benefits Over Prior Non-Pneumatic Tires

Besides its benefits over traditional pneumatic tires, non-pneumatic tire 10 may exhibit multiple advantages over other non-pneumatic tires. Most of these other tires have a solid rim and a solid tire section and are in production for low-speed applications. In comparison to these tires, non-pneumatic tire 10 may be significantly lighter. Interconnected web 40 may allow non-pneumatic tire 10 to absorb impacts significantly better, resulting in a more comfortable ride. In addition, other non-pneumatic tires are not usable at high speeds due to the amount of vibration that is generated.

Some conventional non-pneumatic tires work by placing the portion of the tire that is between the applied load and the contact surface in compression. This causes that section of the tire and its internal structure to deform under tire load. When the body to which the tire is attached is not in motion, this portion of the tire remains deformed under the static load. Over time, this can lead to semi-permanent deformation of the tire causing decreased performance, increased noise and vibration and worse fuel efficiency, among other things. In contrast, buckled section 48 carries very little, if any, load so tire may remain statically deformed for a while and not experience any appreciable semi-permanent deformation.

Benefits Over Other Tension-Based Non-Pneumatic Tires

Figure 19:
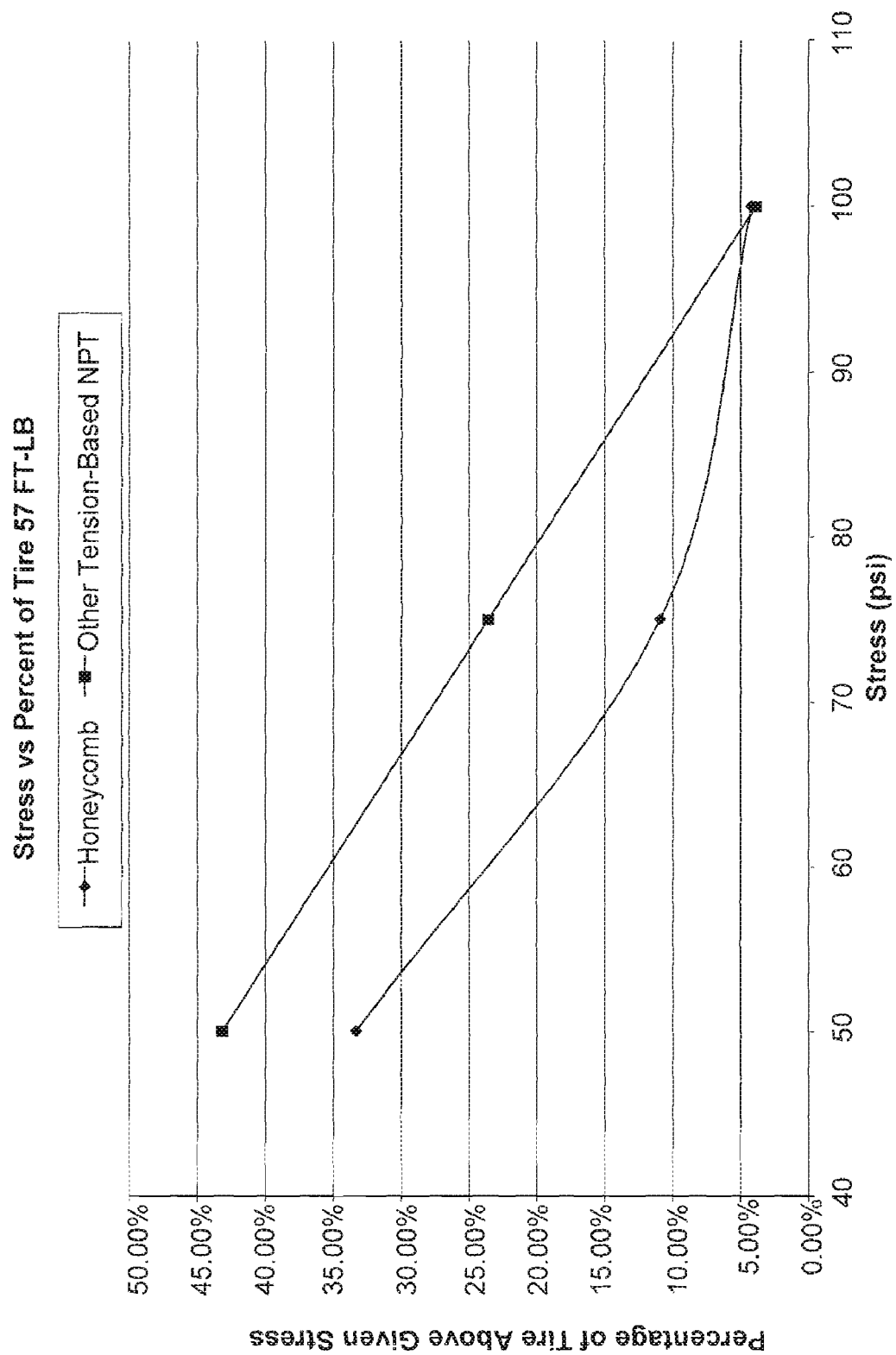
FIG. 19 is a graphical comparison of the relative stresses in the inventive tension-based non-pneumatic tire vs. the percentage of the tire experiencing that stress compared to another tension-based non-pneumatic tire.
Figure 20:
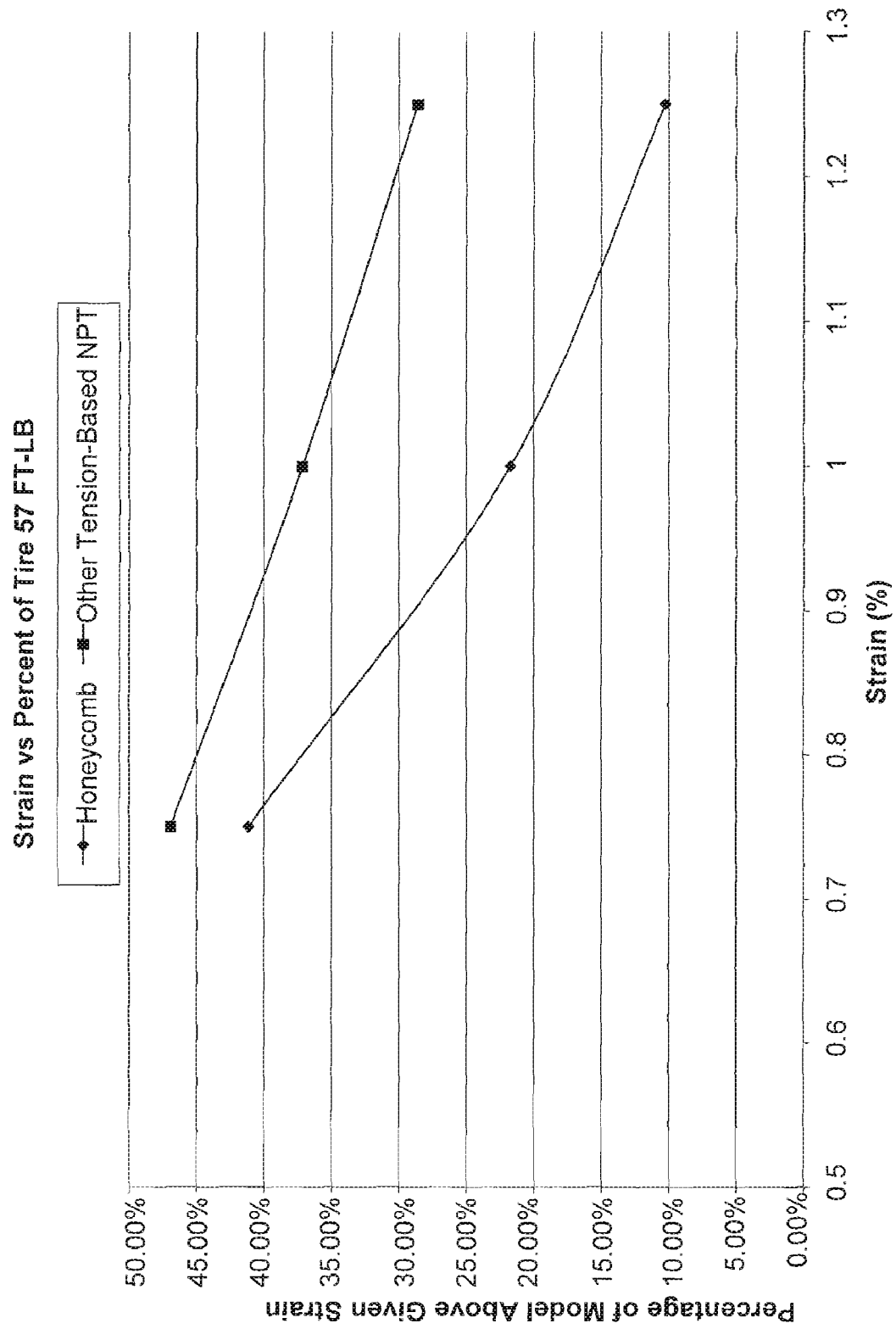
FIG. 20 is a graphical comparison of the relative strains in the inventive tension-based non-pneumatic tire vs. the percentage of the tire experiencing that strain compared to another tension-based non-pneumatic tire.

In comparison to other tension-based non-pneumatic tires, tire 10 of the current invention may demonstrate even further benefits. Non-pneumatic tire 10 may experience smaller stresses and strains under similar loading conditions than other tension-based non-pneumatic tires, as can be seen in FIGS. 19 & 20. By allowing air to flow through the tire 10 and around web elements 42, the design of interconnected web 40 may result in less heat generation as well as less fatigue, prolonging the life of tire 10. The ability of interconnected web 40 to buckle around footprint region 32, thereby causing less reactive force when passing over an obstacle, may also result in less vibration and a better ride. Despite the ability of interconnected web 40 to buckle, it may also be relatively stiff when compared to the internal structure of other tension-based non-pneumatic tires. This may result in less noise being generated, resulting in a quieter ride. It may also cause non-pneumatic tire 10 to experience better starting and stopping performance.

Generally Annular Inner Surface

Non-pneumatic tire 10 comprises a generally annular inner surface 20 that engages a hub 60 to which tire 10 is mounted. Hub 60 has an axis of rotation 12 about which tire 10 spins. Generally annular inner surface 20 has an internal surface 23 and an external surface 24 and may be made of cross-linked or uncross-linked polymers. More specifically, generally annular inner surface may be made of a thermoplastic material such as a thermoplastic elastomer, a thermoplastic urethane or a thermoplastic vulcanizate. Still more specifically, generally annular inner surface 20 may be made of rubber, polyurethane, or some other material. In this application, the term "polymer" means cross-linked or uncross-linked polymers.

For smaller applied loads, L, generally annular inner surface 20 may be adhesively engaged with hub 60 or may undergo some chemical structure change allowing it to bond to hub 60. For larger applied loads, L, generally annular inner surface 20 may be designed in a manner that allows it to engage hub 60 via some form of a mechanical connection such as a mating fit, although a mechanical connection may be used for supporting smaller loads as well. This allows both hub 60 and generally annular inner surface 20 the extra strength to support the larger applied load, L. In addition, a mechanical connection has the added benefit of ease of interchangeability. If non-pneumatic tire 10 needs to be replaced, generally annular inner surface 20 can be detached from hub 60 and replaced. Hub 60 may then be remounted to the axle of the vehicle, allowing hub 60 to be reusable.

Generally Annular Outer Ring

Non-pneumatic tire 10 further comprises generally annular outer ring 30 surrounding interconnected web 40 (discussed below). Outer ring 30 may be designed to deform in an area around and including footprint region 32, which decreases vibration and increases ride comfort. However, since non-pneumatic tire may not have a sidewall, generally annular outer ring 30, combined with interconnected web 40, may also add lateral stiffness to tire 10 so that tire 10 does not unacceptably deform in portions away from footprint region 32.

In one embodiment, generally annular inner surface 20 and generally annular outer ring 30 are made of the same material as interconnected web 40. Generally annular inner surface 20 and generally annular outer ring 30 and interconnected web 40 may be made by injection or compression molding, castable polymer, or any other method generally known in the art and may be formed at the same time so that their attachment is formed by the material comprising the inner surface 20, outer ring 30 and interconnected web 40 cooling and setting.

Figure 1:
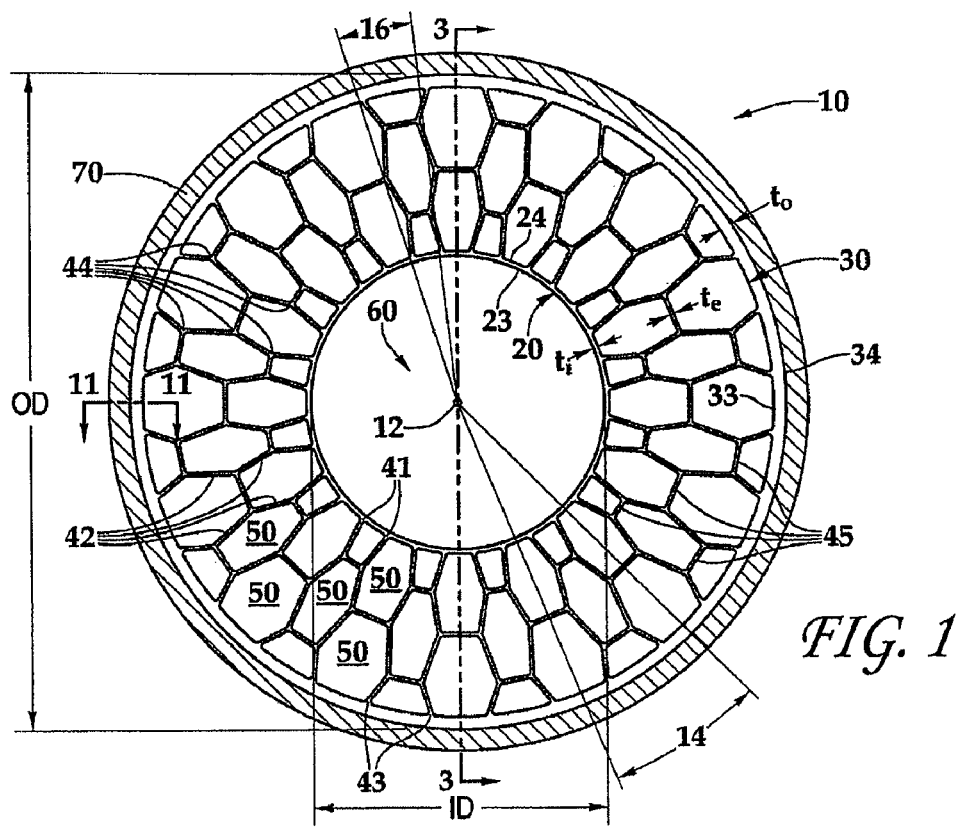
FIG. 1 is a front view of an undeformed non-pneumatic tire.
Figures 11, 12, 13:
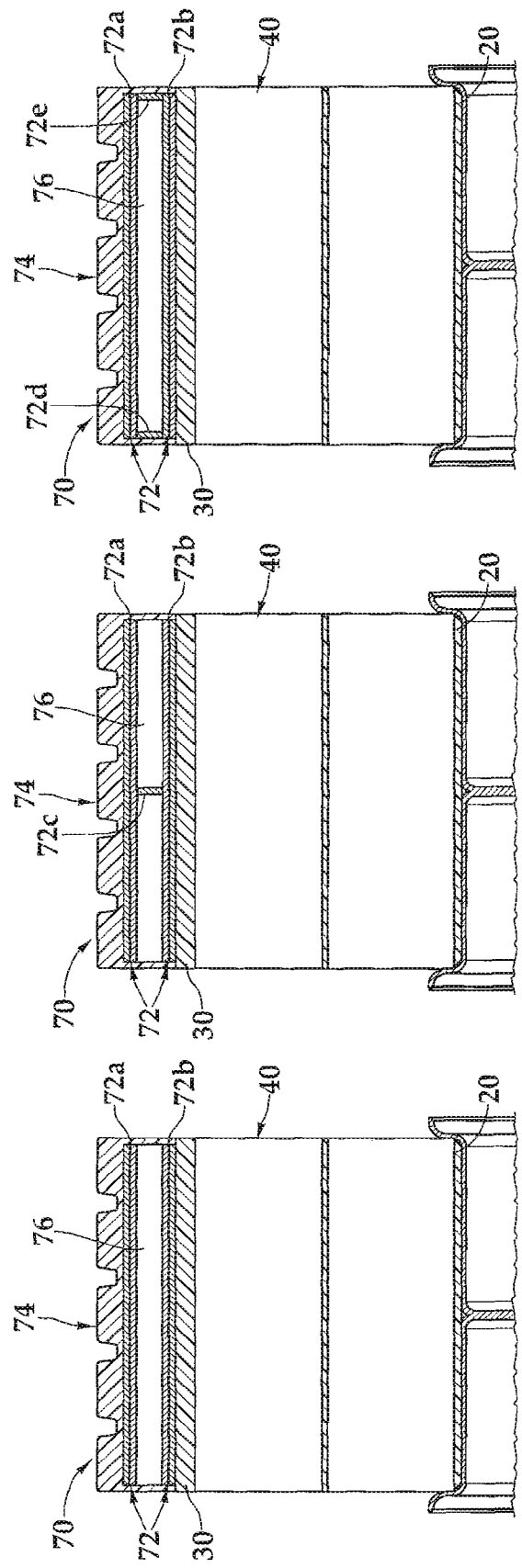
FIG. 11 is a sectional view of a prior art tread-carrying portion attached to a non-pneumatic tire taken along line 11-11 in FIG. 2.
FIG. 12 is a sectional view of another tread-carrying portion attached to a non-pneumatic tire taken along line 11-11 in FIG. 2.
FIG. 13 is a sectional view of still another tread-carrying portion attached to a non-pneumatic tire taken along line 11-11 in FIG. 2.

As shown in FIG. 1, generally annular outer ring 30 may further have a radially external surface 34 to which a tread-carrying layer 70 is attached. Attachment may be done adhesively or using other methods commonly available in the art. In addition, as seen in FIG. 11-13, tread-carrying layer 70 may comprise embedded reinforcing belts 72 to add increased overall stiffness to non-pneumatic tire 10 wherein the embedding of the reinforcing belts 72 is accomplished according to methods commonly available in the art. Reinforcing belts 72 may be made of steel or other strengthening materials.

FIGS. 11-13 show several possible examples of the arrangement of reinforcing belts 72 in tread-carrying layer 70. FIG. 11 is a prior art version showing a tread 74 at a radial outermost portion of tire 10. Moving radially inwardly are a plurality of reinforcing belts 72a, a layer of support material 76, and a second plurality of reinforcing belts 72b. In this embodiment, reinforcing belts 72a, 72b are arranged so that each belt is generally constant radial distance from axis of rotation 12.

Turning to the embodiment of FIG. 12, a tread-carrying layer 70 similar to that of FIG. 11 is shown. However, the embodiment of FIG. 12 shows the layer of support material 76 being approximately bisected in a generally radial direction by at least one transverse reinforcing belt 72c. Support material may be a rubber, polyurethane or similar compound that supports the changing loads generated by friction between footprint region 32 and the ground and the torsional twisting of the rest of tread-carrying layer 70 caused by rotation of tire 10 about axis 12.

Tread-carrying layer 70 of FIG. 13 resembles that of FIG. 11 but comprises two additional groupings of reinforcing belts 72. In addition to the generally radially constant plurality of reinforcing belts 72a, 72b, tread-carrying layer 70 in FIG. 13 includes transverse reinforcing belts 72d, 72e. Transverse reinforcing belts 72d, 72e include at least one reinforcing belt 72d proximate a longitudinally inner surface and at least one reinforcing belt 72e proximate a longitudinally outer surface, such that reinforcing belts 72a, 72b, 72d, 72e generally enclose layer of support material 76 in a generally rectangular box shape.

Interconnected Web

Interconnected web 40 of non-pneumatic tire 10 connects generally annular inner surface 20 to generally annular outer ring 30. It comprises at least two radially adjacent layers 56, 58 of web elements 42 that define a plurality of generally polygonal openings 50. In other words, a slice through any radial portion of non-pneumatic tire 10 extending from the axis of rotation 12 to the generally annular outer ring 30 passes through or traverses at least two generally polygonal openings 50. Generally polygonal openings 50 may assume various shapes, some of which are shown in FIGS. 4-10. In many embodiments, a majority of generally polygonal openings 50 may be generally hexagonal. However, it is possible that each one of the plurality of generally polygonal openings 50 has at least three sides. In one embodiment, the plurality of generally polygonal openings 50 are either generally hexagonal in shape or hexagonal in shape circumferentially separated by openings that are generally trapezoidal in shape, as can be seen in FIG. 1, giving interconnected web 40 a shape that may resemble a honeycomb.

Interconnected web 40 may be designed such that one web element 42 connects to generally annular inner surface 20 at any given point or line along generally annular inner surface such that there are a first set of connections 41 along generally annular inner surface. Likewise, one web element 42 may connect to generally annular outer ring 30 at any given point or line along an internal surface 33 of generally annular outer ring such that there are a second set of connections 43 along generally annular outer ring. However, more than one web element 42 may connect to either generally annular inner surface or to generally annular outer ring at any given point or line.

As shown in FIGS. 4-10, interconnected web 40 further comprises intersections 44 between web elements 42 in order to distribute applied load, L, throughout interconnected web 40. In these embodiments, each intersection 44 joins at least three web elements 42. However, intersections 44 may join more than three web elements 42, which may assist in further distributing the stresses and strains experienced by web elements 42.

Web elements 42 may be angled relative to a radial plane 16 containing the axis of rotation 12 that also passes through web element 42. By angling the web elements 42, applied load, L, which is generally applied perpendicular to axis of rotation 12, may be eccentrically applied to web elements 42. This may create a rotational or bending component of an applied load on each element, facilitating buckling of those web elements 42 subjected to a compressive load. Similarly situated web elements 42 may all be angled by about the same amount and in the same direction relative to radial planes 16. Preferably, however, circumferentially consecutive web elements 42, excluding tangential web elements 45, of a layer of plurality of generally polygonal openings 50 are angled by about the same magnitude but measured in opposite directions about radial planes such that web elements 42 are generally mirror images about radial plane 16 of one another.

Figure 7:
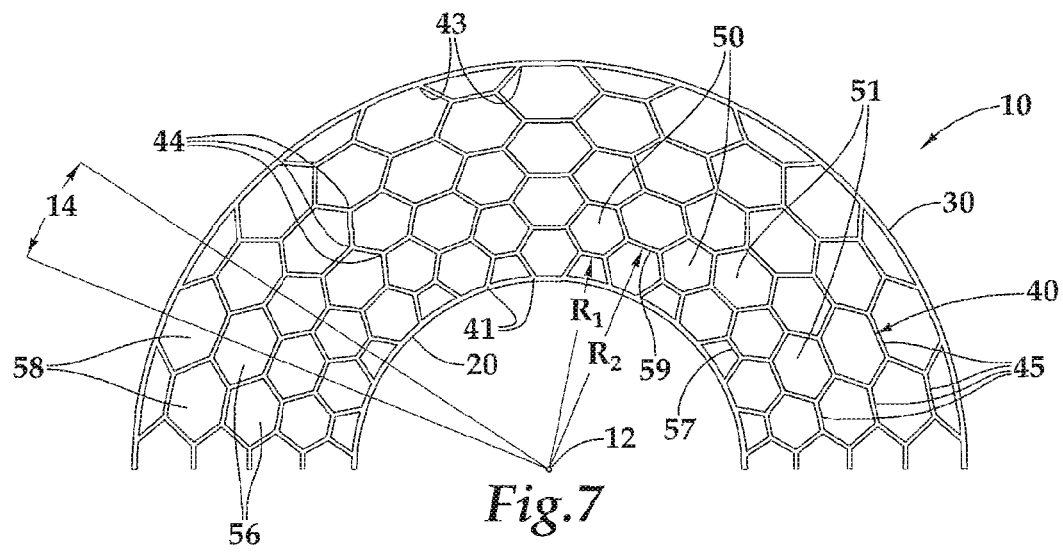
FIG. 7 is a front view of yet another embodiment of an undeformed non-pneumatic tire.

Each of the openings within the plurality of generally polygonal tubular openings 50 may, but is not required, to be similar in shape. FIG. 7, for example shows a first plurality of generally polygonal openings 50 that is different in shape from a second plurality of generally polygonal openings 51. In this embodiment, at least one opening of the first plurality of general polygonal openings 50 may be smaller than at least one opening of the second plurality of generally polygonal openings 51. FIG. 7 also shows that each generally polygonal opening in the first plurality of generally polygonal openings 50 has an inner boundary 57 spaced a radial distance, $R_1$, from axis of rotation 12 and each generally polygonal opening in the second plurality of generally polygonal openings 51, has a second inner boundary 59 spaced a radial distance, $R_2$, which may be greater than $R_1$, from axis of rotation 12.

Figure 8:
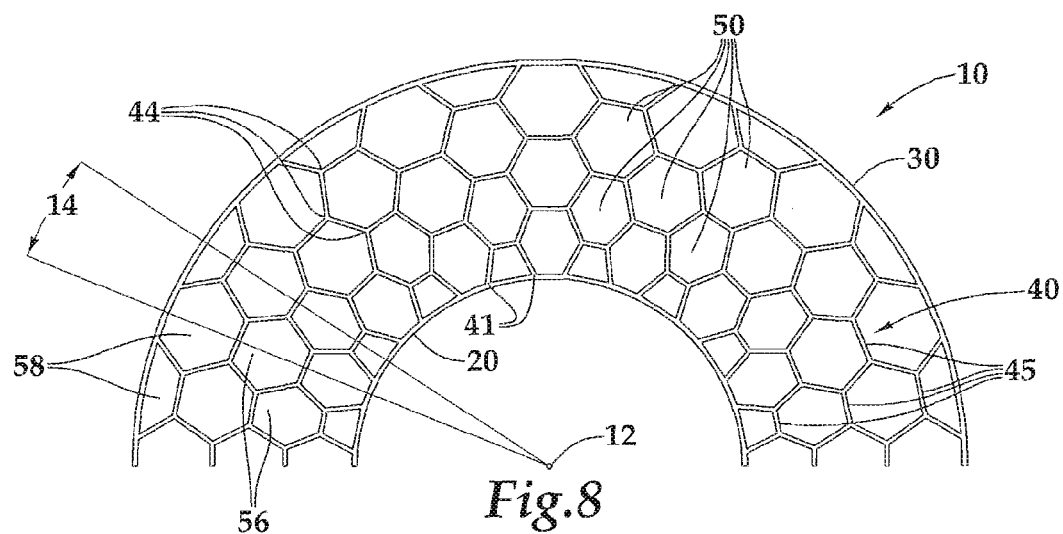
FIG. 8 is a front view of another embodiment of an undeformed non-pneumatic tire.

As shown in FIGS. 7 & 8, openings in a radially inner layer 56 may be similarly shaped as compared to those in a radially outer layer 58 but may be sized differently from those openings such that the generally polygonal openings 50 increase in size when moving from opening to opening in a radially outward direction. However, turning to FIG. 10, a second plurality of generally polygonal openings 51 in a radially outer layer 58 may also be smaller than those in a first plurality of generally polygonal openings 50 in a radially inner layer 56. In addition, the second plurality of generally polygonal openings may be either circumferentially separated from each other by a third plurality of generally polygonal openings 53 or may be greater in number than the first plurality of generally polygonal openings 50, or it may be both.

FIGS. 1-9 show several variations of plurality of generally polygonal openings 50 that are generally hexagonally shaped. As shown, these openings may be symmetrical in one direction or in two directions, or they may not be symmetrical at all. For example, in FIG. 1, radial symmetry planes 14 bisect several of the plurality of generally polygonal openings 50. Those openings are generally symmetrical about radial symmetry planes 14. However, interconnected web 40 of tire 10 may also be generally symmetrical as a whole about radial symmetry planes. In comparison, second plurality of generally polygonal openings 14 may be generally symmetrical about similar radial symmetry planes 14. In addition, as shown in FIGS. 7-8, a second plurality of generally polygonal openings may be generally symmetrical about lines tangent to a cylinder commonly centered with axis of rotation 12, providing a second degree of symmetry.

Figure 9:
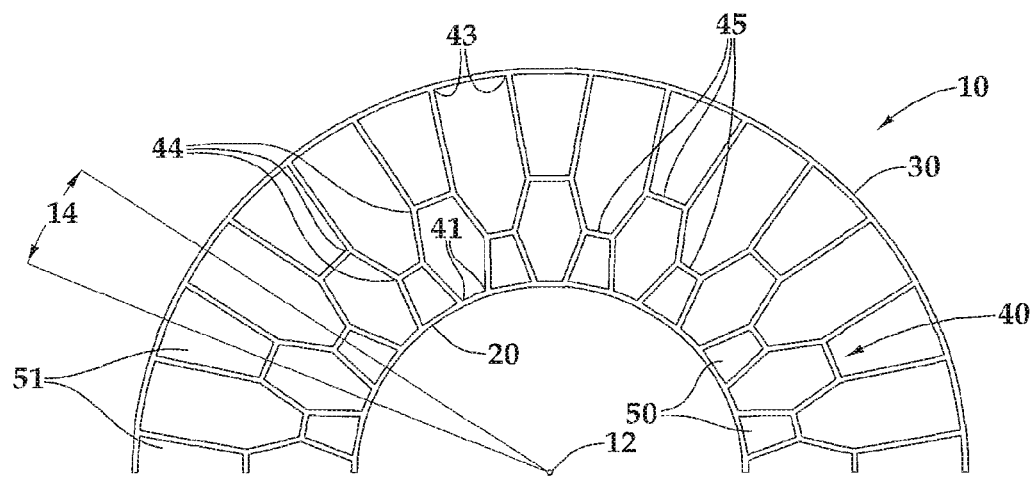
FIG. 9 is a front view of still another embodiment of an undeformed non-pneumatic tire.
Figure 10:
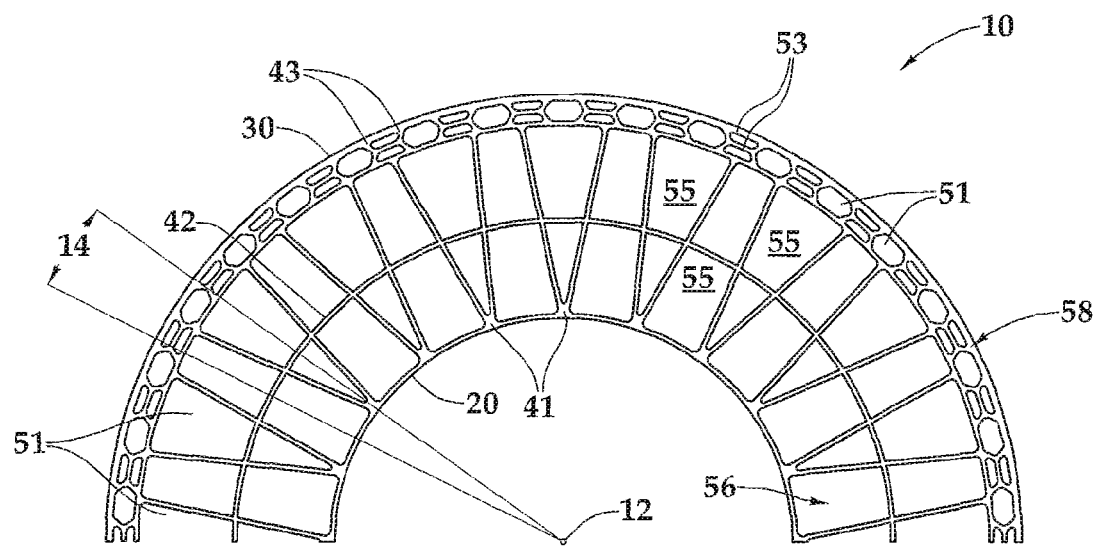
FIG. 10 is a front view of a further embodiment of an undeformed non-pneumatic tire.

Web elements 42 may have significantly varying lengths from one embodiment to another or within the same embodiment. For example, interconnected web 40 in FIG. 7 comprises web elements 42 that are generally shorter than web elements of the interconnected web shown in FIG. 6. As a result interconnected web 42 may appear more dense in FIG. 7, with more web elements 42 and more generally polygonal openings 50 in a given arc of tire 10. In comparison, FIGS. 9 and 10 both show interconnected webs 40 which web elements 42 substantially vary in length within the same interconnected web. In FIG. 9, radially inward web elements 42 are generally shorter than web elements 42 located comparatively radially outward. However, FIG. 10 shows radially inward web elements 42 that are substantially longer than its radially outward web elements 42. As a result, interconnected web 40 of FIG. 9 appears more inwardly dense than interconnected web 42 of FIG. 10.

Remaining with FIG. 10, an interconnected web 40 is shown such that web elements 42 define a radially inner layer 56 of generally polygonal openings 50 that is significantly larger than, a radially outer layer 58 of generally polygonal openings 50. Radially inner layer 56 may comprise alternating wedge-shaped openings 55 that may or may not be similarly shaped. As shown, second plurality of generally polygonal openings 51 may be separated from first plurality of generally polygonal openings 50 by a generally continuous web element 42 of interconnected web 40 spaced at a generally constant radial distance from axis of rotation 12. Generally continuous, generally constant web element 42 may assist in providing further stiffness to non-pneumatic tire 10 in regions that are resistant to deformation.

The combination of the geometry of interconnected web 40 and the material chosen in interconnected web 40 may enable an applied load, L, to be distributed throughout the web elements 42. Because web elements 42 are relatively thin and may be made of a material that is relatively weak in compression, those elements 42 that are subjected to compressive forces may have a tendency to buckle. These are the elements that are generally between the applied load, L, that generally passes through axis of rotation 12 and footprint region 32 and are represented as buckled section 48 in FIG. 2.

When buckling occurs, the remaining web elements 42 may experience a tensile force. It is these web elements 42 that support load, L. Although relatively thin, because web elements 42 may have a high tensile modulus, E, they may have a smaller tendency to deform but instead may help maintain the shape of generally annular outer ring 30.

Although generally annular inner surface 20, generally annular outer ring 30, and interconnected web 40 may be comprised of the same material, they may all have different thicknesses. Generally annular inner surface may have a first thickness, $t_i$, generally annular outer surface may have a second thickness, $t_o$, and interconnected web may have a third thickness, $t_e$. As shown in FIG. 1, first thickness $t_i$ may be less than second thickness $t_o$. However, third thickness, $t_e$, may be less than either first thickness, $t_i$, or second thickness, $t_o$. This is preferred as a thinner web element 42 buckles more easily when subjected to a compressive force whereas a relatively thicker generally annular inner ring 20 and generally annular outer surface 30 may help maintain lateral stiffness of non-pneumatic tire 10 in an unbuckled region by better resisting deformation.

Thickness, $t_e$, of web elements 42 may vary, depending on predetermined load capability requirements. As the applied load, L, increases, web elements 42 may increase in thickness, $t_e$, to provide increased tensile strength, reducing the size of the openings in the plurality of generally polygonal openings 50. However, thickness, $t_e$, should not increase too much so as to inhibit buckling of those web elements 42 subject to a compressive load. As with choice of material, thickness, $t_e$, may increase significantly with increases in applied load, L.

In addition to web elements 42 that are angled relative to radial planes 16 passing through axis of rotation 12, interconnected web 40 may also include tangential web elements 45, as shown in FIGS. 1-9. Tangential web elements 45 are oriented such that they are generally aligned with tangents to cylinders or circles centered at axis of rotation 12. Tangential web elements 45 are preferred because they assist in distributing applied load, L. When applied load, L, is applied, web elements 42 in a region above axis of rotation 12 are subjected to a tensile force. Without tangential web elements 45, interconnected web 40 may try to deform by having the other web elements 42 straighten out, orienting themselves in a generally radial direction, resulting in stress concentrations in localized areas. However, by being oriented in a generally tangential direction, tangential web elements 45 distribute applied load, L, throughout the rest of interconnected web 40, thereby minimizing stress concentrations.

Staying with FIGS. 1-9 a plurality of generally polygonal openings 50 are shown wherein each one of said plurality of generally polygonal openings 50 is radially oriented. Generally polygonal openings may be oriented such that they are symmetrical about radial symmetry planes 14 that pass through axis of rotation 12. This may facilitate installation by allowing tire 10 to still function properly even if it is installed backwards because it should behave in the same manner regardless of its installed orientation.

Figure 14:
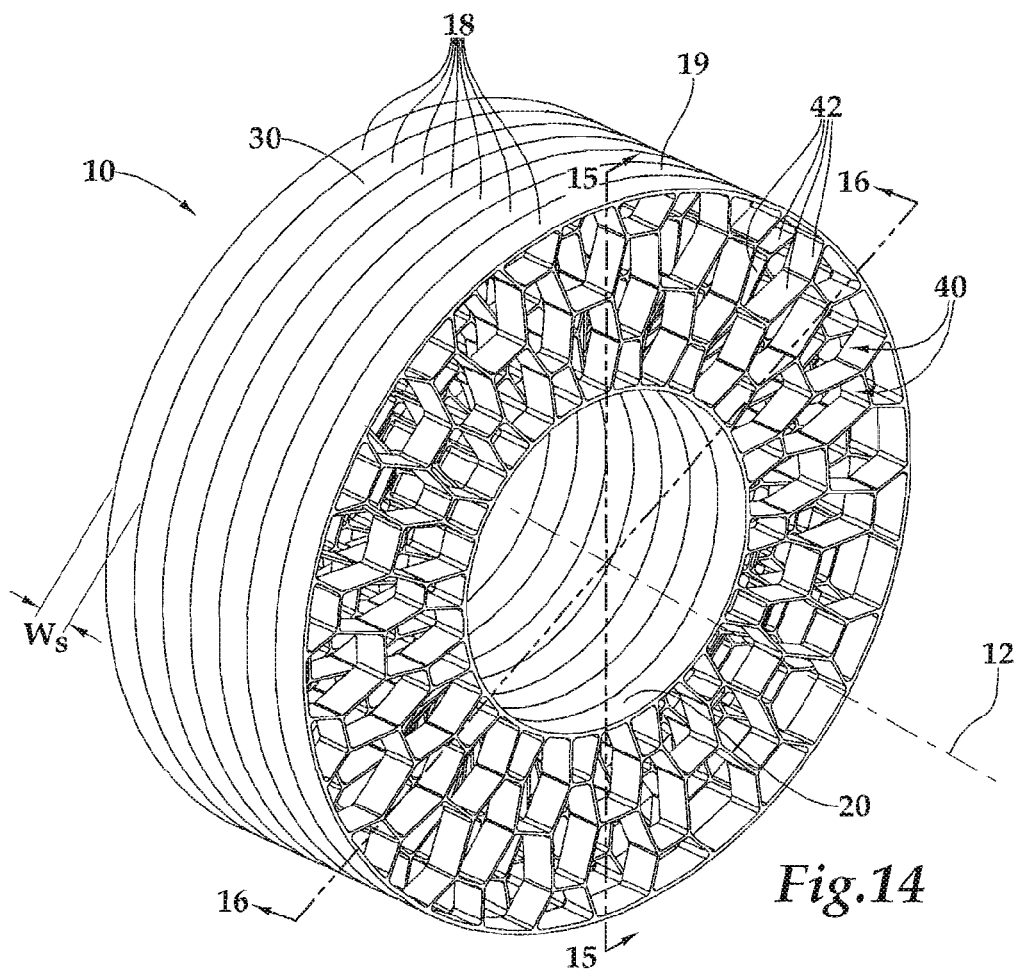
FIG. 14 is a perspective view of an embodiment of an undeformed non-pneumatic tire with circumferentially offset segments.
Figure 15:
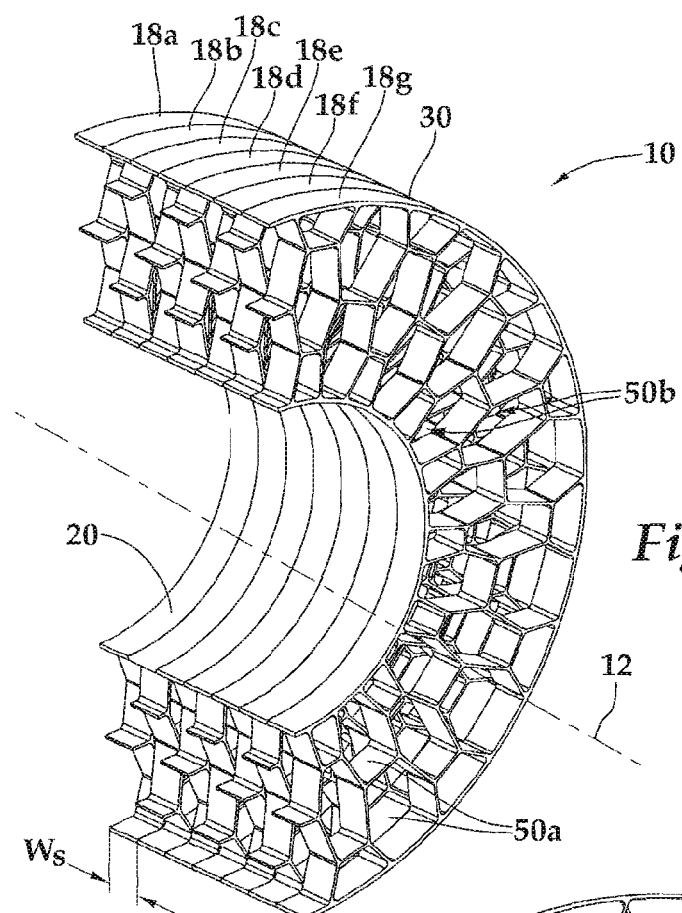
FIG. 15 is a sectional perspective view of the undeformed non-pneumatic tire taken along line 15-15 in FIG. 14.
Figure 16:
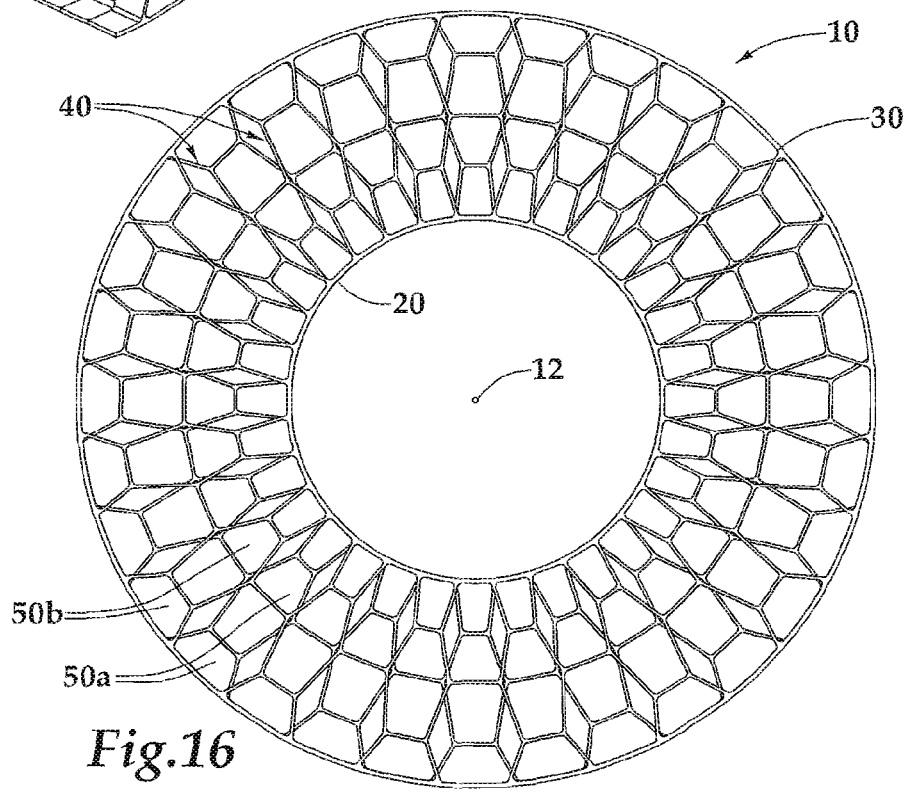
FIG. 16 is a sectional view of the undeformed non-pneumatic tire taken along line 16-16 in FIG. 14.

Interconnected web 40, generally annular inner surface 20 and generally annular outer ring 30 may be molded all at once to yield a product that has a width or depth of the finished non-pneumatic tire. However, interconnected web 40, generally annular inner surface 20 and generally annular outer ring 30 may be manufactured in steps and then assembled as seen in the embodiments of FIGS. 14-16. In these figures, each segment 18 has an interconnected web 40 having the same pattern as the non-pneumatic tire 10 of FIG. 1.

FIG. 14 shows a perspective view where tire 10 comprises a plurality of segments 18. Segments 18 may have a generally uniform width, $W_s$, but they may also have different widths. Segments 18 may be made from the same mold so as to yield generally identical interconnected webs 40, but they may also be made from different molds to yield varying patterns of interconnected webs 40. In addition, as seen in FIGS. 14 and 15, segments 18 may be circumferentially offset from one another so that a plurality of generally polygonal openings 50a of one segment 18 is not generally aligned with a plurality of similarly-shaped generally polygonal openings 50b of a radially adjacent segment 19. The segments may or may not alternate so that every other segment 18 is generally aligned. FIG. 15 shows an embodiment having seven segments 18, where the first, third, fifth and seventh segments 18a, 18c, 18e and 18g are generally aligned with each other, the second, fourth and six segments 18b, 18d, and 18f are generally aligned with each other, but the two groups of segments are not generally aligned as a whole. In addition, FIG. 16 is a cutaway view showing two radially adjacent segments 18, 19 that are not generally aligned. This stacking orientation may help with buckling around footprint region 32, may decrease vibration and noise, and may provide greater torsional stiffness to non-pneumatic tire 10.

The choice of materials used for interconnected web 40 may be an important consideration. The material that is used should buckle easily in compression, but be capable of supporting the required load in tension. Preferably, interconnected web is made of a cross-linked or uncross-linked polymer, such as a thermoplastic elastomer, a thermoplastic urethane, or a thermoplastic vulcanizate. More generally, in one embodiment, the interconnected web 40 may preferably be made of a relatively hard material having a Durometer measurement of about 40D with a high tensile modulus, E, of about 21 MPa or about 3050 psi. However, tensile modulus may vary significantly for rubber or other elastomeric materials, so this is a very general approximation. In addition, Durometer and tensile modulus requirements may vary greatly with load capability requirements.

Other advantages may be obtained when using a polymer material such as polyurethane to make non-pneumatic tire 10 instead of the rubber of traditional tires. A manufacturer of the claimed invention may only need a fraction of the square footage of work space and capital investment required to make rubber tires. The amount of skilled labor necessary may be significantly less than that of a rubber tire plant. In addition, waste produced by manufacturing components from a polyurethane material may substantially less than when using rubber. This is also reflected in the comparative cleanliness of polyurethane plants, allowing them to be built in cities without the need for isolation, so shipping costs may be cut down. Furthermore, products made of polyurethane may be more easily recyclable.

Cross-linked and uncross-linked polymers, including polyurethane and other similar non-rubber elastomeric materials may operate at cooler temperatures, resulting in less wear and an extended fatigue life of tire 10. In addition, the choice of materials for interconnected web 40 and outer ring 30 may significantly decrease roiling resistance, leading to about a 10% decrease in fuel consumption. Polyurethane has better abrasion resistance and, therefore, better tread wear than a traditional rubber tire and, unlike rubber, it is inert, making it resistant to oxidization or reaction with other materials that make rubber harden or even crack.

Figure 17:
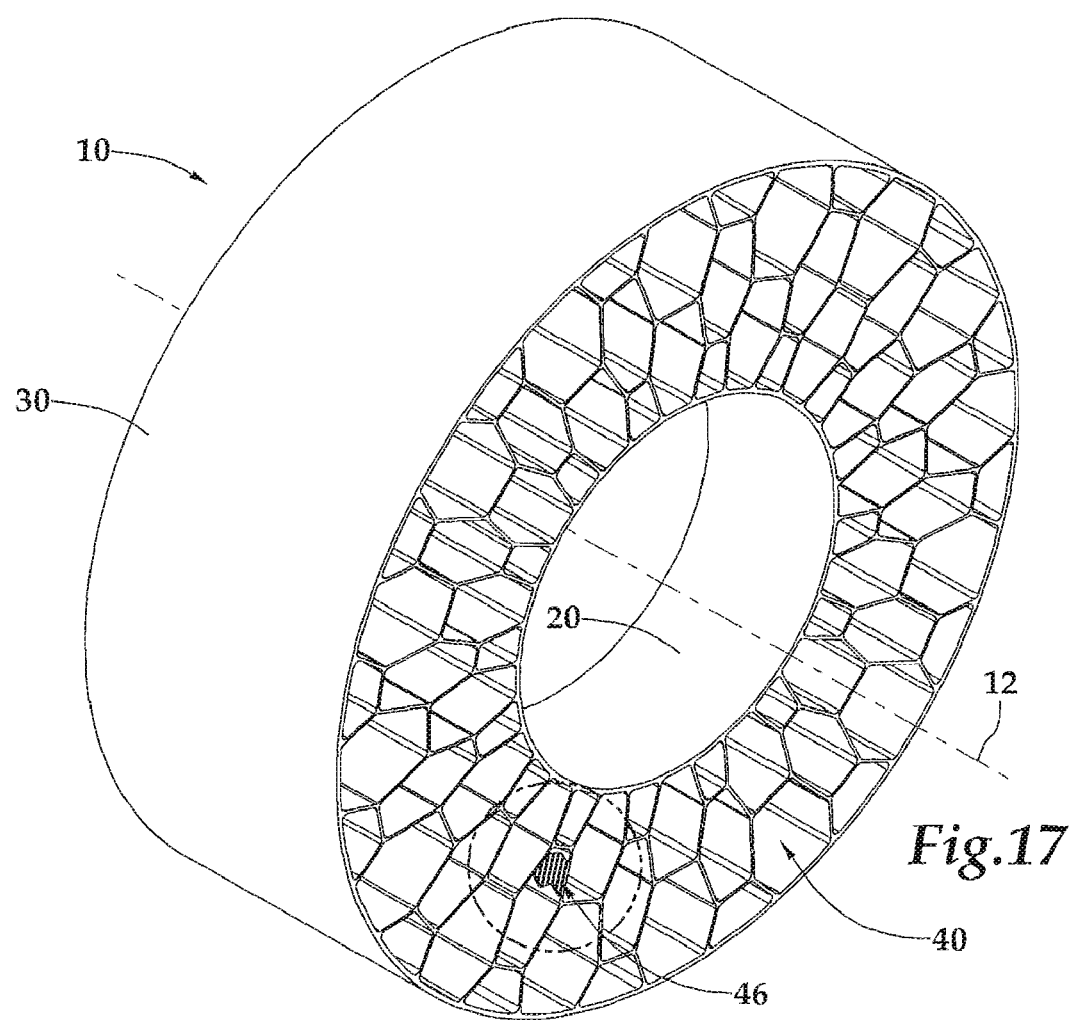
FIG. 17 is a perspective view of the nonpneumatic tire of FIG. 1
Figure 18:
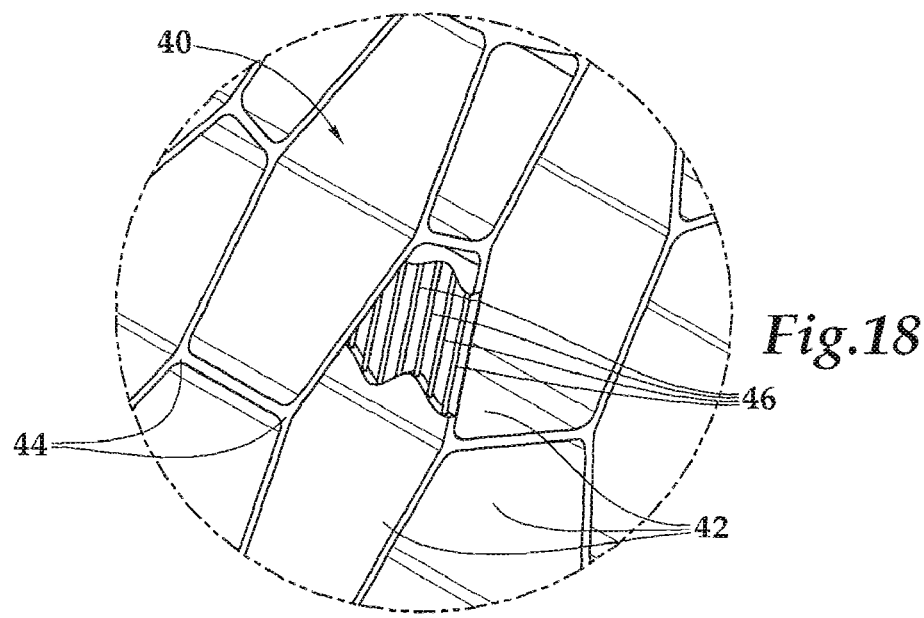
FIG. 18 is an enlarged, cutaway view of the interconnected web of the nonpneumatic tire of FIG. 17.

In another embodiment shown in FIGS. 17 & 18, the interconnected web 40 comprises web elements 42 that also contain strengthening components 46 such as carbon fibers, KEVLAR®, or some additional strengthening material to provide additional tensile strength to the interconnected web 40. Properties of strengthening components 46 may be high strength in tension, low strength in compression, light weight, good fatigue life and an ability to bond to the material comprising interconnected web 40.

In an additional embodiment, interconnected web 40 may be directly engaged by hub 60, tread-carrying layer 70 or both. For example, hub 60 and tread-carrying layer 70 may either or both comprise dovetail joints. Hub 60 and tread-carrying layer 70 may then be inserted into a mold with the material comprising interconnected web filling the joints. In this case, radially external surface 62 of hub 60 comprises generally annular inner surface 20 and a radially internal surface 78 of tread-carrying layer 70 comprises generally annular outer ring 30. Therefore, when interconnected web 40 sets, the interconnected web is directly engaged, obviating the need to bond or otherwise affix interconnected web 40 to generally annular outer ring 30, for example.

EXAMPLE

In one embodiment, a non-pneumatic tire 10 possesses the interconnected web 40 of the configuration shown in FIGS. 1 & 2. Tire 10 has a radius of about 9.5 inches and hub 60 has a radius of about 4⅜ inches.

In general, the force required for buckling of a column is governed by the equation: $F\_buckling=(KEI\pi^2)/l^2$ where K=a constant whose value depends on how the ends of the column are affixed, E=tensile modulus, I=the area moment of inertia, and l=the unsupported length of the column.

If each web element 42 of interconnected web 40 is modeled as its own thin column, the radially innermost elements will be fixed at one end and free to move laterally at another end. In this instance, K=¼.

In this example, interconnected web 40 and generally annular outer ring 30 are made of a similar material having a tensile modulus, E, of about 21 MPa or 3050 psi.

Tire 10 may be about 8 inches wide and each web element 42 of interconnected web 40 may be between about 0.04 inch and 0.1 inch thick. A thickness of about 0.08 inch will be used for this example. In this case, the area moment of inertia, $I=(w*h^3)/12$ where w=the width of each web element 42, 8 inches and h=the thickness, 0.08 inch. Therefore, I is about 0.000341 in^4.

Using the tire and hub radii mentioned above, and observing the pattern of interconnected web 40 as seen in FIGS. 1 & 2, each web element 42 may have an approximate length of about (9.5"-4.375")/4, or approximately 1.28 inch.

Based on these numbers, $F\_buckling=(KEI\pi^2)/l^2$ about 1.59 lbs. In addition, web elements 42 of interconnected web 40 are angled with respect to a radial direction to facilitate buckling, which may further decrease F_buckling.

In this application, non-pneumatic tire 10 is subjected to a load, L, of about 250 lbs. Load, L, is distributed throughout web elements 42 such that the entire load, L, is not borne by a single web element, 42. However, the web elements 42 most directly aligned with the direction of load, L, should bear the greatest portion of the load. Since L is significantly larger than F_buckling, elements 42 of interconnected web 40 that are subjected to a compressive force will buckle and not support load, L.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A non-pneumatic tire for supporting an applied load comprising:
a generally annular inner surface that engages a hub having an axis of rotation,
a generally annular outer ring,
an interconnected web between said generally annular inner surface and said generally annular outer ring comprising at least two radially adjacent layers of elements at every radial cross-section of said tire defining a plurality of generally polygonal openings, the interconnected web including a plurality of tangential web elements that are generally aligned with a tangent to a circle centered about the axis of rotation;
said generally annular outer ring and said interconnected web being deformable when said tire is subjected to said applied load;
wherein a plurality of said web elements are angled relative to a plane containing said axis of rotation to facilitate buckling of said web elements, wherein, when the applied load is applied, web elements in a region above the axis of rotation are subjected to a tensile force while web elements in a region between the applied load and a footprint region are subjected to a smaller portion of the applied load as compared to the remaining portions of the web elements.

2. A non-pneumatic tire according to claim 1, wherein said plurality of generally polygonal openings comprises a first plurality of generally polygonal openings having a first shape and a second plurality of generally polygonal openings having a second shape different from said first shape.

3. A non-pneumatic tire according to claim 2, wherein at least one of said first plurality of generally polygonal openings and at least one of said second plurality of generally polygonal openings are traversed when moving in any radially outward direction from said axis of rotation.

4. A non-pneumatic tire according to claim 2, wherein each of said first plurality of generally polygonal openings has a first inner boundary spaced at a first radial distance and each of said second plurality of generally polygonal openings has a second inner boundary spaced at a second, greater radial distance.

5. A non-pneumatic tire according to claim 4 wherein at least one generally polygonal opening of said first plurality of generally polygonal openings is larger than at least one generally polygonal opening of said second plurality of generally polygonal openings.

6. A non-pneumatic tire according to claim 1, wherein one web element engages said inner surface at a given location.

7. A non-pneumatic tire according to claim 1, wherein one web element engages said outer ring at a given location.

8. A non-pneumatic tire according to claim 1, wherein said interconnected web comprises intersections between said web elements, said intersections joining at least three web elements.

9. A non-pneumatic tire according to claim 1, wherein said generally annular inner surface has a first thickness, said generally annular outer ring has a second thickness, and said web elements have a third thickness, said third thickness being smaller than said first thickness or said second thickness.

10. A non-pneumatic tire according to claim 1, wherein each one of said plurality of generally polygonal openings is radially oriented.

11. A non-pneumatic tire according to claim 1, wherein each one of said plurality of generally polygonal openings has at least three sides.

12. A non-pneumatic tire according to claim 1, wherein said plurality of generally-polygonal openings are generally hexagonally shaped.

13. A non-pneumatic tire according to claim 1, further comprising a plurality of joined segments each having a width narrower than a width of said tire.

14. A non-pneumatic tire according to claim 13, wherein a first joined segment is circumferentially offset from an adjoining segment.

15. A non-pneumatic tire according to claim 13, wherein a first joined segment has an interconnected web that is substantially similar to an interconnected web of a second joined segment.

16. A non-pneumatic tire according to claim 1, wherein a relatively radially inner layer of said plurality of generally polygonal openings comprises alternating generally wedge-shaped openings.

17. A non-pneumatic tire according to claim 1, wherein each one of said plurality of generally polygonal openings is generally symmetrical about a radial symmetry plane.

18. A non-pneumatic tire according to claim 1, wherein said interconnected web comprises a generally continuous, radial web element that is spaced at a generally constant radial distance from the axis of rotation, the web element being intermediate to said generally annular inner surface and said generally annular outer ring.

19. A non-pneumatic tire according to claim 1, wherein said generally annular inner surface is adhesively engaged with said hub.

20. A non-pneumatic tire according to claim 1, wherein said generally annular inner surface is chemically bonded to said hub.

21. A non-pneumatic tire according to claim 1, wherein said interconnected web is made of a polymer.

22. A non-pneumatic tire according to claim 1, further comprising a tread-carrying layer affixed to a radially external surface of said generally annular outer ring.

23. A non-pneumatic tire according to claim 22, wherein said tread-carrying layer comprises reinforcing belts.

24. A non-pneumatic tire comprising:
a generally annular inner surface that attaches to a hub,
a generally annular outer ring,
an interconnected web between said generally annular inner surface and said generally annular outer ring, and
an axis of rotation;
said interconnected web defining a plurality of openings circumferentially spaced around said tire and radially spaced at varying distances from said axis or rotation, so as to support an applied load by working in tension, said interconnected web including a plurality of web elements and a plurality tangential web elements that are generally aligned with a tangent to a circle centered about the axis of rotation, said plurality of tangential web elements defining, at least in part, at least some of the plurality of openings circumferentially spaced around said tire, wherein, when the applied load is applied, web elements in a region above the axis of rotation are subjected to a tensile force while web elements in a region between the applied load and a footprint region are subjected to a smaller portion of the applied load as compared to the remaining portions of the web elements.

25. A non-pneumatic tire comprising:
a generally annular inner surface that attaches to a hub,
a generally annular outer ring,
a radially external surface engaging a tread-carrying layer, an interconnected web between said generally annular inner surface and said generally annular outer ring, and an axis of rotation said interconnected web comprising web elements and tangential web elements that are generally aligned with a tangent to a circle centered about the axis of rotation, the interconnected web defining a plurality of generally hexagonally shaped openings circumferentially spaced around said tire and radially spaced at varying distances from said axis of rotation, a first plurality of generally quadrilaterally-shaped openings adjacent said generally annular inner surface and a second plurality of generally quadrilaterally-shaped openings adjacent said generally annular outer ring, each of said first plurality of generally quadrilaterally-shaped openings and each of said second plurality of generally quadrilaterally-shaped openings circumferentially separated from each other of said first plurality of generally quadrilaterally-shaped openings and each other of said second plurality of generally quadrilaterally-shaped openings, respectively, by at least one of said plurality of hexagonally shaped openings, so as to support a load by working in tension, wherein web elements positioned above the axis of rotation and directly aligned with the direction of the applied load bear the greatest portion of the load.

26. A non-pneumatic tire according to claim 25, said tread-carrying layer comprising a reinforcing-belted tread.

* * * * *